United States Patent [19]

Walles et al.

[11] Patent Number: 4,923,753

[45] Date of Patent: May 8, 1990

[54] CONTROLLED-RELEASE COMPOSITIONS FOR ACIDS

[75] Inventors: Wilhelm E. Walles, Freeland; Donald L. Tomkinson, Auburn, both of Mich.

[73] Assignee: The Dow Chemical Company, Midland, Mich.

[21] Appl. No.: 30,957

[22] Filed: Mar. 26, 1987

[51] Int. Cl.$^5$ .............................................. B01J 13/02
[52] U.S. Cl. ............................ 428/402.24; 252/8.553; 502/81
[58] Field of Search ................ 428/402.24; 252/8.553; 502/81; 106/308 B, 308 M, 416, 417

[56] References Cited

U.S. PATENT DOCUMENTS

| | | | |
|---|---|---|---|
| 3,429,827 | 2/1969 | Ruus | 264/4.7 X |
| 3,441,507 | 4/1969 | Schlefer et al. | 252/95 |
| 3,459,665 | 8/1969 | Schlefer et al. | 252/95 |
| 3,494,786 | 2/1970 | Nielsen | 260/502 R |
| 3,494,787 | 2/1970 | Lund et al. | 427/213 |
| 3,639,285 | 2/1972 | Nielsen | 252/100 |
| 3,645,911 | 2/1972 | van Rosauw et al. | 264/4.6 |
| 3,666,680 | 5/1972 | Briggs | 252/301.21 |
| 3,847,830 | 11/1974 | Williams et al. | 128/83.5 |
| 3,891,572 | 6/1975 | Moody et al. | 106/308 M X |
| 3,952,741 | 4/1976 | Baker | 424/405 |
| 3,992,317 | 11/1976 | Brichard et al. | 252/186.32 |
| 4,003,841 | 1/1977 | Hachmann et al. | 252/94 |
| 4,070,300 | 1/1978 | Moroni et al. | 252/190 |
| 4,094,808 | 6/1978 | Stewart et al. | 252/186.26 |
| 4,120,812 | 10/1978 | Lutz | 252/186.22 |
| 4,126,573 | 11/1978 | Johnston | 252/99 |
| 4,128,495 | 12/1978 | McCrudden | 8/111 |
| 4,131,562 | 12/1978 | Lutz et al. | 252/186.31 |
| 4,134,850 | 1/1979 | McCrudden et al. | 252/186.26 |
| 4,136,052 | 1/1979 | Mazzola | 252/94 |
| 4,196,107 | 4/1980 | Jones et al. | 524/522 X |
| 4,225,451 | 9/1980 | McCrudden et al. | 252/99 |
| 4,287,135 | 9/1981 | Stober et al. | 260/502 R |
| 4,315,959 | 2/1982 | Buys et al. | 106/308 M X |
| 4,321,157 | 3/1982 | Harris et al. | 252/174.25 |
| 4,321,301 | 3/1982 | Brichard et al. | 428/403 |
| 4,327,151 | 4/1982 | Mazzola | 428/407 |
| 4,403,994 | 9/1983 | Hignett | 8/111 |
| 4,421,664 | 11/1983 | Anderson et al. | 210/233 |
| 4,421,669 | 12/1983 | Brichard | 252/186.25 |
| 4,552,672 | 11/1985 | Walker | 252/8.553 |
| 4,756,844 | 7/1988 | Walles et al. | 428/402.24 X |

FOREIGN PATENT DOCUMENTS

| | | |
|---|---|---|
| 3321082 | 6/1982 | Fed. Rep. of Germany . |
| 59-196399 | 4/1983 | Japan . |
| 59-193999 | 11/1984 | Japan . |
| 59-194000 | 11/1984 | Japan . |
| 59-204697 | 11/1984 | Japan . |

Primary Examiner—John F. Terapane
Assistant Examiner—Gary Geist
Attorney, Agent, or Firm—Barbara J. Sutherland

[57] ABSTRACT

A controlled release composition for use with liquid acids, and a method of preparation is disclosed. The composition comprises (1) a porous matrix comprising and substantially inert to an absorbed acid; (2) a midlayer surrounding the matrix, this midlayer consisting essentially of a salt of the absorbed acid; and (3) a membrane surrounding the matrix, the membrane being exterior of the midlayer, the membrane further being substantially inert to the midlayer and permeable to a selected environment, the thickness and permeability of the membrane comprising means for controlling diffusion of the environment therethrough.

The midlayer can be applied as a coating to the acid-bearing matrix, or it can be evolved by exposing the acid-bearing matrix to a base such as ammonia gas or a solid metal oxide for a time sufficient to allow reaction of a proportion of the acid at or near the surface of the matrix with the base to form a layer of the corresponding salt.

40 Claims, 1 Drawing Sheet

CONTROLLED-RELEASE COMPOSITIONS FOR ACIDS

BACKGROUND OF THE INVENTION

The present invention relates to controlled-release and delayed delivery compositions. More particularly, the present invention relates to controlled-release compositions comprising acids.

It is well-known that concentrated acids present unique problems both in handling and in use. Acids such as concentrated sulfuric, phosphoric, hydrobromic, and hydrochloric are extreme safety hazards, potentially causing serious or even fatal injury if they are spilled onto skin or clothing. These acids, in concentrated form, are very irritating to tissue. In use great care must be employed when adding the acids to water solutions, for example, because of the explosive acid splatter that results due to rapid heat evolution. Shipping and storage also present problems. The acids are highly corrosive to metals and must generally be protected in glass-lined equipment, which is not always practical. For example, use in oil wells for generation of carbon dioxide from carbonate formations in many instances necessitates pumping the acid through more than a mile of steel pipe. At present corrosion inhibitors are used to slow down the attack of the acid on the steel. However, this is generally only partially successful and is limited to applications at mild temperatures.

Thus, it would be desirable to have the acid safely locked up in encapsulated, e.g., coated, particles of some type in a water slurry during the pumping process in the oil well, and then to be able to effect or predict complete release of the acid payload after arrival in the underground oil-bearing formation.

Because of the dangers involved in handling of concentrated acids in particular, and the corrosion problems that may be encountered in their transport and use, it has been found to be desirable to develop a composition and method of making these acids more easily and safely handleable. The present invention is such a composition and method, and is an encapsulated form of the liquid acid which can be released by a variety of mechanisms.

Encapsulation in general involves the formation of a protective wall of some type around a small particle, agglomeration of particles, or droplet of agent material. The wall is composed of a material suitable to achieve this goal, the material varying according to the degree of permeability and elasticity needed, the type of undesirable reactions to be avoided, and a number of other variables, each of which must be considered to ensure the best wall material choice. It is known in the art that, to encapsulate a liquid, it is generally necessary to first freeze and/or dry it, use a thickening additive, or absorb it into a porous matrix such as a porous clay. Then the wall material can be applied by one of a variety of processes, also depending in part on the agent material selected.

One method commonly employed for encapsulation of various agent materials involves the use of fluidized beds. In this process particles of the material to be encapsulated are sprayed with wall material while they are suspended in an air stream. The wall material sprayed can be of a polymer solution, molten wax, emulsion, suspension such as a latex, or other material, and is continued until the desired wall thickness is obtained. A design modification called the Wurster column can be employed to reduce particle agglomeration.

However, concentrated acids present fewer processing options because of their interaction with many potential wall materials. For example, water-based suspensions, when sprayed on concentrated acid droplets or absorbate particles, allow reaction between the acid and the water. This prevents formation of a proper coating and, in addition, the viscosity of the wall material in many cases tends to encourage agglomeration of the droplets or adsorbates, thereby inhibiting fluidization.

Regardless of the method or materials chosen, the goal is to produce a composition capable of controlled agent release, such as release at a predetermined time. This release can be immediate upon introduction into a selected environment, it can be delayed for a specific amount of time, or in the case of a number of agent particles or drops having differing wall thicknesses or compositions, it may be continuous over a period of varying length. The release is effected by varying mechanisms acting on the wall, such as by dissolution by the environment, reaction with the environment, or diffusion causing rupture of the capsule wall. U.S. Pat. No. 3,952,741, for example, illustrates a controlled delivery system based on osmotic bursting of a water-permeable wall These mechanisms are effective for a wide variety of uses. For example, the rupture diffusion mechanism is particularly well-suited to applications where release of the agent is to be delayed for a predetermined amount of time and then effected fairly rapidly. This is particularly useful where local high concentrations are undesirable, and a uniformly-timed release is desired. Conversely, the dissolution method may be preferred for slower, somewhat sequential release where local high concentrations do not present problems However, regardless of the release mechanism chosen, the timing of release can be most precisely determined if the wall thicknesses over a sampling of a number of encapsulated particles are very uniform in thickness.

SUMMARY OF THE INVENTION

Accordingly, the present invention provides a composition comprising (1) a porous matrix, the matrix comprising and substantially inert to an absorbed acid: (2) a midlayer surrounding this matrix and consisting essentially of a salt of the acid: and (3) a membrane surrounding the matrix, the membrane being exterior of the midlayer, the membrane further being substantially inert to the midlayer and permeable to a selected environment, the thickness and permeability of the membrane comprising means for controlling diffusion of the environment therethrough.

The present invention also provides a method of preparing an encapsulated composition of the type described. The method comprises the steps of (1) absorbing an acid into a porous matrix that is substantially inert to the acid: (2) surrounding the matrix with a midlayer consisting essentially of a salt of the acid: (3) surrounding the matrix with a membrane, the membrane being exterior of the midlayer, the membrane further being substantially inert to the midlayer and permeable to a selected environment, the thickness and permeability of the membrane comprising means for controlling diffusion of the environment therethrough.

DESCRIPTION OF THE PREFERRED EMBODIMENTS

Figure 1:
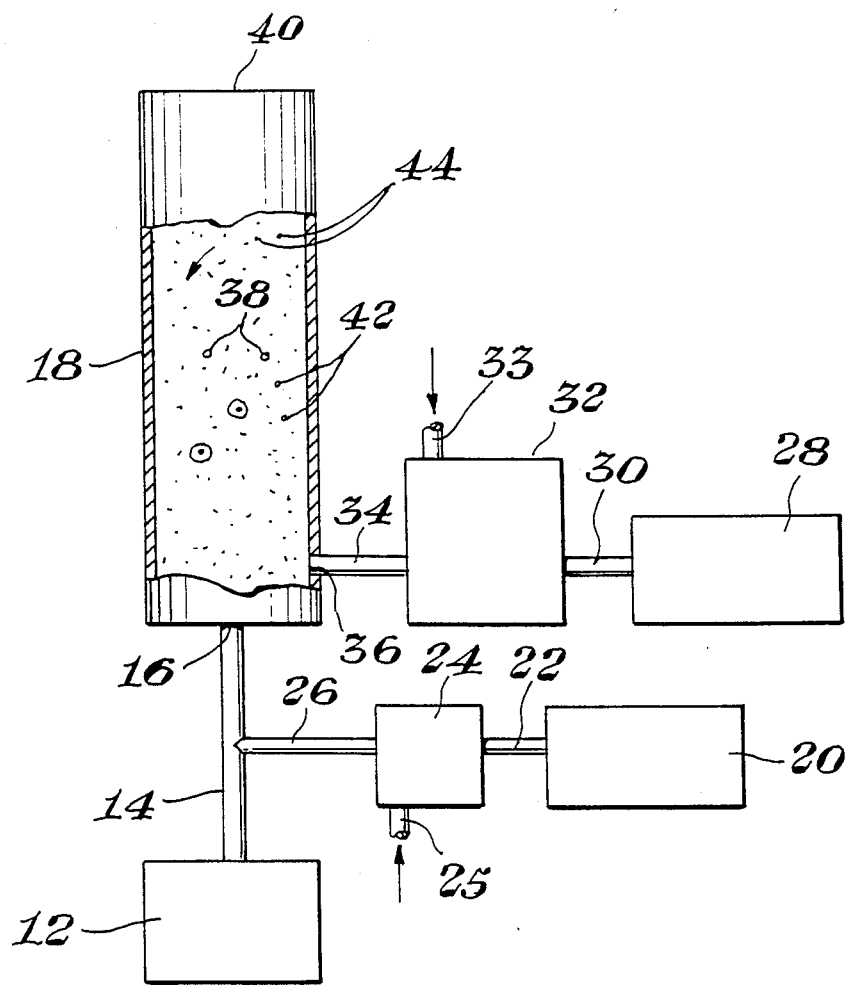

Briefly, the present invention is an encapsulated composition in which a liquid acid is absorbed into a substantially inert porous matrix. The matrix has a surrounding midlayer comprised of a salt of the absorbed acid, and the whole is surrounded with a membrane. This membrane is permeable to the environment in which the acid will be used. This environment, or at least a component of the environment, can diffuse into or through the membrane until, by one of the mechanisms described below, the membrane ruptures and/or dissolves and releases the acid-bearing matrix, thus exposing the acid to the selected environment and allowing the acid to mix with it.

Various different release mechanisms have been found to be operable in the present invention, and may be individually applicable to a given combination of selected acid, membrane, and environment, or may be concurrently or even synergistically effected. In one preferred embodiment the release mechanism is that of simple osmotic diffusion, in which the increased volume within the membrane due to the presence of a quantity of the environment causes rupture of the membrane and concurrent release of the acid to the environment at large. The diffusion of the environment through the permeable membrane increases the volume enclosed, resulting in distension of the membrane and, eventually, its rupture and resultant release of the acid to the environment.

In another preferred embodiment, the release mechanism requires selection of both acid and environment such that the two will react to liberate a gas. Diffusion of the environment still occurs, and the reaction of this acid and environment results in gas liberation as well. This in turn results in a hastened distension, and therefore hastened rupture, of the membrane.

In a third preferred embodiment the release mechanism comprises simple dissolution of the membrane by the environment.

The acid encapsulated according to the present invention can also be released by other methods, such as by crushing, pH changes, and so forth. The crushing, for example, can be performed by any means of inducing mechanical pressure from the outside of the composition. These additional methods can be employed in lieu of diffusion-activated release, gas-liberation release, dissolution release, or other mechanisms, or concurrently with any or all such mechanisms.

The first component of the present composition to be selected is the acid. The acid employed is preferably a concentrated acid, and its concentration can vary. Preferred acids are the strong mineral acids, i.e., sulfuric and phosphoric acids, as well as nitric and hydrohalogen acids such as hydrochloric, hydrobromic, hydroiodic, and hydrofluoric acids. Liquid organic acids, such as formic, acetic, propionic, and lactic acids are also effectively comprised in the compositions of the present invention. The acid concentration may be up to and including 100 percent, with the proviso that the acid is a liquid at the selected concentration and temperature. Preferred concentrations are from about 70 to about 90 percent. The volatility of the selected acid should also be taken into consideration. Acids which do not exhibit considerable volatility at room temperature are preferred. Those that do exhibit considerable volatility at this temperature, such as nitric, formic, and hydrohalogenic acids, can still be used in the compositions of the present invention, but will require extra care in preparation, as described in the preparation discussion below.

The next choice to be made is that of the matrix. The matrix can comprise any porous material, comminuted to desired size, that is substantially inert to the selected acid. Porous fired clay, i.e., a hydrated aluminum silicate, is preferred here because it does not react with the acids and also exhibits good strength, low cost, and high porosity. Its inertness to the acid is attributable in part to the fact that it has either no lime content or a very low lime content. Lime and other bases are obviously undesirable components of the matrix because of the resultant neutralization of the absorbed acid prior to release into the environment. Porosity is preferably in the range of from about 40 percent to about 60 percent, more preferably about 50 percent. This helps to create an acid payload of sufficient volume to be of practical interest. Other preferred matrices are porous silicas, e.g., natural pumice and dried silica gels.

Once the matrix has been chosen the selected acid is absorbed into the pores. This can be done by pouring the selected acid into a mass of the matrix particles and agitating the particles to allow substantial exposure of all surfaces to the acid. The particles may be agitated manually, mechanically, with air, or by other efficacious means. The time of exposure is preferably sufficient to allow for optimal absorption of the acid into the matrix pores.

With the acid absorbed into the matrix the salt midlayer can be either applied or evolved. This midlayer is effectively a crust surrounding the matrix particle, this crust protecting the acid-bearing matrix from coming into substantial contact with the membrane. This is desirable because the permeable membrane material would in many cases be corroded by or otherwise react with the acid, which would negate the benefits of the present invention as described. The important midlayer comprises a salt of the selected acid, e.g., a sulfate where sulfuric acid is absorbed, or a phosphate where phosphoric acid is absorbed.

The salt, as noted, can either be applied in a separate step by any efficacious coating method prior to the application of the membrane, or it can preferably be "evolved." By "evolved" it is meant that the salt midlayer can be formed by a reaction between (1) the absorbed acid at or near the surface of the matrix; and (2) a gas, liquid, or solid base that results in the formation of a salt. For this purpose it is preferred to expose the matrix with absorbed acid to ammonia gas, thereby forming the ammonium salt of the absorbed acid. Other means of forming this midlayer are effective, although they may in some cases be somewhat less convenient. For example, the matrix particles comprising the absorbed acid can be exposed to a finely divided caustic (NaOH) powder or a mist of preferably greater than 50 percent concentration of caustic in water. It is also possible to form the salt midlayer by exposing the acid-bearing matrix particles to various solid metal oxides or hydroxides comprising metals selected from Group IA or Group IIA of the Periodic Table, or to zinc oxide or hydroxide. Preferred among these are CaO, MgO, NaOH, KOH, LiOH, $Zn(OH_2)$, and mixtures thereof. The ammonia gas method is preferred primarily because of its ease of application.

Another choice to be made is that of membrane. The membrane, or wall, surrounds the matrix with the absorbed acid. This membrane is selected of a material that preferably satisfies four requirements: (1) it should be permeable, to a determinable degree, to the selected environment in which the acid will be used: (2) it should be substantially nonreactive with both the salt midlayer and the environment within the delay time, although it can be a material that will dissolve or disperse after bursting has occurred in some uses; (3) it should either not interfere with the acid after release, or else operate in a complementary way, such as synergistically: and (4) it should provide release of the acid under preselected conditions. In addition, a fifth requirement can preferably be met when the release mechanism is to be either the gas liberation release or diffusion release: (5) the membrane can be elastic to a determinable degree, to enable a given delay in release time while the membrane is distending. If the degrees of permeability and elasticity are precisely measurable, it is possible to predetermine or control the amount of delay in the release time with great accuracy. Permeability generally is inversely proportional to the thickness of the membrane, so calculations will preferably take the thickness into account along with the known degrees of permeability and elasticity.

In general, the membrane is applied as a coating to the matrix which comprises the absorbed acid and is surrounded with the salt midlayer, forming a capsule. This membrane can comprise any material, or mixture of materials, meeting the above requirements. Among possible membrane materials with wide application are natural latexes: synthetic latexes such as polystyrene latex, styrene-butadiene rubber, neoprene, polyvinyl chloride, polyvinylidene chloride, polyvinylidene dichloride, e.g., a SARAN* suspension, and ethylene acrylic acid, e.g., PRIMACOR*; thermoplastic polymers such as polystyrene and polycarbonate: cellulose esters: glycolide/lactide copolymers: polytetrafluoroethylene dispersions, e.g., TEFLON*: and mixtures thereof. Other possible membrane materials include lacquers comprising solvents with dissolved polymeric materials such as cellulose acetate, powder coating materials, cellulose ethers such as METHOCEL* and ETHOCEL*, starches and chemically modified starch products dissolved or suspended in water, colloidal suspensions such as suspensions of colloidal silica and colloidal sulfur, gases capable of coatings formed of gases such as mononomeric vapors, and plasma-generated coatings.
(*SARAN and *PRIMACOR are trademarks of The Dow Chemical Company. *TEFLON is a trademark of Du Pont de Nemours, E.I., Company.)
(*METHOCEL and *ETHOCEL are trademarks of The Dow Chemical Company).

In a preferred embodiment of the present invention there is incorporated into the membrane material an amount of at least one compound that is inert to both the salt midlayer and the membrane material, and which comprises particles having submicron diameters. This inert compound, which serves as an anticoalescent as described below, is essentially a finely comminuted powder of colloidal-size particles. Preferred for this use are compounds such as polytetrafluoroethylene, colloidal silica, and compounds selected from the group of fumed microfibrous inorganics consisting of fumed silica, fumed alumina, fumed magnesia, fumed calcia, fumed carbon (carbon black), and fumed titania. Anticoalescent mixtures of any of these can also be used. Other choices include any organic or inorganic compound which is comminuted to submicron particles and meets the inertness limitation. If organic compounds are selected, polymers of higher molecular weight are preferred because of the relative ease with which these form colloids. Because of cost, aqueous colloidal silica is preferred.

One or more of these anticoalescent compounds is added to the membrane material, preferably as an aerosol during the coating process by which the membrane is applied to the agent. Alternatively, some compounds can be incorporated directly into the membrane material prior to application. Particularly well-suited for this is polytetrafluoroethylene, which is very effective in conjunction with a latex medium. The advantage to the use of this as an anticoalescent is the greatly enhanced ease in predetermining accurately the level of the anticoalescent relative to the membrane material as a whole. Polytetrafluoroethylene can alternatively be applied in aerosol form.

The membrane and anticoalescent materials can be applied to the acid-bearing matrix in any of various ways. One preferred method is by fluidization of the matrix in one of a variety of types of fluidized bed reactors, while spraying with a solution or suspension of the chosen membrane material or materials from either above or below the fluidized matrix.

The selected reactor may be of the continuous type, or of the batch type as shown in FIG. 1.

In this apparatus heated air, nitrogen, a mixture of these, or other gas from heated gas source 12 passes through gas inlet conduit 14 to gas inlet port 16 and enters the fluidization bed 18. At the same time an anticoalescent source 20 flows through generator inlet conduit 22 to aerosol generator 24, is mixed with a diluent gas entering through membrane diluent gas inlet 25, and then flows through generator outlet conduit 26 and is mixed with the heated gas in gas inlet conduit 14. Alternatively, the anticoalescent from anticoalescent source 20 may be arranged to flow from aerosol generator 24 directly into heated gas source 12. Also concurrently, membrane material from membrane material source 28 flows through spray pump inlet conduit 30 to spray pump 32, is mixed with diluent gas entering through anticoalescent diluent gas inlet 33, and then is sprayed out through spray pump outlet conduit 34 through spray port 36 into the fluidization bed 18.

The matrix particles 38 are introduced into fluidization bed 18 by opening filter 40 at the top of fluidization bed 18. The particles have previously, in a separate procedure, absorbed the desired amount of the selected liquid acid and, in a second procedure, the salt midlayer has been evolved or applied as discussed above. These matrix particles are fluidized in the anticoalescent-bearing gas stream coming through gas inlet port 16 and subsequently or concurrently are exposed to the membrane material being introduced through spray port 36. Thus, the anticoalescent and spray are applied simultaneously, and droplets of membrane material 42 and anticoalescent 44 collide with and coat the matrix particles 38. Heated gas, often containing a substantial moisture content depending on the membrane material used, escapes through filter 40 as it is separated from the fluidized particle and any aerosols not incorporated in a particle coating. Although the figure shows only one spray inlet port, more than one may be used to increase the speed of coating or to apply differing membrane materials sequentially, as for multilayered coatings. The ports may then be arranged according to the order of membrane layers desired.

There are four main advantages to the addition of the anticoalescent to the membrane, whether it is added to the membrane prior to or during the application of the membrane to the acid-bearing matrix: (1) the anticoalescent greatly improves the uniformity of the thickness of the membrane obtained by reducing agglomeration of the membrane material during the coating process, thus making the time of release more precisely determinable and further narrowing the time period required for complete release over a given batch: (2) the anticoalescent reduces the amount of membrane material needed, to as low as ⅓ to 1/5 of what would be required for a given release time otherwise: (3) the anticoalescent reduces the amount of time needed to apply a given membrane thickness to as little as ⅓ to 1/5 of the overall time: and (4) the anticoalescent reduces or eliminates agglomeration of the membrane material which can result in fouling of the coating means, e.g., of the fluidized bed.

Agglomeration of the membrane material has been found to result in the formation of doublets, triplets, etc., of matrix particles within one continuous coating. Following completion of a coating process, the doublets, etc., appear to frequently separate, leaving uncoated or less coated portions of the perimeter. These portions alter the time of release of these particles, thus often substantially reducing the uniformity and sharpness of release times over a given batch. With the addition of the inert anticoalescent, the number of agglomerated matrix particles is greatly reduced, and the timing of release is therefore both narrower and more precisely predictable.

For example, microscopic examination shows that when a fumed microfibrous inorganic compound is selected, there is a tendency for it to form bead-strings of about 10 Angstroms diameter. These bead-strings are connected as microfibrous strings. The microfibrous network does not appear to have any detrimental effect on the coagulation of the membrane material, and forms a network throughout the interior and exterior of the membrane. Some other anticoalescents remain in discrete areas within the membrane. Either way, the presence of the anticoalescent within the membrane material and in some cases on its outer surface substantially reduces the number of doublets, triplets, etc., formed, so the membranes are substantially more uniform in thickness within a given batch.

In determining the release time it is preferable to calculate the quantities of acid-bearing matrix, membrane, and anticoalescent materials relative to each other. These calculations should preferably take into account the variable features of each, such as permeability of the membrane material, reactivity of the acid and environment if applicable, and so forth.

In the present invention, in the cases of a diffusion-based release mechanism, the membrane, including both membrane material and the incorporated anticoalescent, can be of any desired thickness such that diffusion of the environment through it proceeds at a rate that produces the desired rate of gas liberation, other general volume increase, or dissolution, with the result that the releasing rupture of the membrane is controlled. In a preferred embodiment of the invention, this thickness is within the range of from about 1 μm to about 40 μm, and more preferably within the range of from about 5 μm to about 10 μm. These thicknesses are preferred from a standpoint of convenience and economy. Since the thickness of the membrane is inversely proportional to its permeability, there is also a correlation between membrane thickness and the amount of time to elapse prior to release. This relationship will also vary if the acid reacts with the environment.

In order to enable the correct membrane thickness, it is possible to also add thickeners or plasticizers to the selected membrane material or to apply multiple membranes. For example, the addition of a plasticizer such as dioctylphthalate to a polyvinyl chloride coating material may be used to produce a very thin membrane, within the range of from about 2 μm to about 5 μm, on a matrix having an uncoated diameter of about 1 mm, i.e., a surface area of about 0.031 cm$^2$ in the case of a substantially spherical matrix. This extremely thin membrane is probably enough to prevent significant diffusion and resultant reaction in a very humid environment, but will allow almost immediate acid release upon introduction into, for example, an aqueous liquid environment.

Conversely, a membrane thickness of about 10 μm, of the same composition and on the same matrix particle, is calculated to result in a delay within the range of about 4½ hours and about 5 hours prior to burst release of acid into an aqueous liquid environment.

In general, the matrix-to-membrane area ratio should be taken into account in calculating desired membrane thickness, and this is preferably within the range of from about 30:1 to about 3:1, and more preferably from about 10:1 to about 6:1. The diameter of the matrix is preferably within the range of from about 0.1 mm to about 3.0 mm, and more preferably from about 0.5 mm to about 2.0 mm. The desired membrane thickness is also heavily dependent upon the composition of the environment to which it will be introduced. Factors such as the presence of ions in a liquid environment, expressed as total load of salts and as pH, will be a determining factor also. This could be a significant factor when the selected environment will be, for example, a brine fluid of some type.

The level of substantially inert anticoalescent in the membrane can also vary, and is preferably within the range of from about 0.1 ppm to about 50,000 ppm, more preferably from about 1 ppm to about 5,000 ppm, and most preferably from about 5 ppm to about 50 ppm. When the anticoalescent is to be fed into a fluidized bed coater separately from the membrane material, a rate of addition of about 0.1 g/hr per 10 liter reactor volume is preferred: however, a range of from about 0.05 g/hr to about 10 g/hr is effective. These rates will approximate some of the ppm ranges given above.

One problem that may be encountered, depending on the matrix chosen, is that the midlayer, formed either by the reaction of the acid and the base or by the application of a compatible salt, is sticky. This stickiness can cause agglomeration even before any membrane material is applied to the matrix particle. The problem can be remedied by using an inert substance to dry the surface of the matrix prior to application of the membrane. Particularly effective for this is expanded mica. The mica is fluidized with the matrix, and then excess mica can be removed by sieving prior to application of the membrane material.

The following examples are intended to illustrate embodiments of the present invention. They are not intended to be, nor should they be construed as being, limitative of the scope of the invention.

EXAMPLE 1

Fired porous clay, having about 50% porosity, is saturated with a solution of 85% phosphoric acid. This is done by placing a vacuum on the clay particles which have been covered with an excess of phosphoric acid. Excess acid is then removed, first in a Buchner funnel and then the sticky clay matrix particles are tumbled with excess expanded mica to dry the surface. The expanded mica is removed by sieving. Saturated clay particles are then placed in an enclosed glass pot, and while stirring, they are exposed to gaseous $NH_3$. The $NH_3$ reacts with a small fraction of the phosphoric acid resulting in a salt being formed on the exterior surface of the particles.

About 300 g of the above particles are coated in a Uni-Glatt fluidized bed with a 25 percent SARAN* latex solution. About 648 g of latex solution is sprayed over about 1 hour. Intake air for fluidization contains fumed silica aerosol in a proportion of about 5 parts per million. The result is predicted to be acid-bearing particles that will allow exposure of the acid about 12 hours after introduction into water.

(*SARAN is a trademark of the Dow-Chemical Company.)

EXAMPLE 2

Fired porous clay, having about 50% porosity, is saturated with concentrated sulfuric acid. This is done in the manner described in Example 1. The final product is predicted to be a controlled release composition in which the sulfuric acid is released at about 10 hours after initial contact with water.

EXAMPLE 3

HCl is absorbed into fired porous clay particles as described in Example 1. The fired porous clay particles are then exposed to ammonia gas while stirring, until a midlayer of ammonium chloride forms over the surface of each particle.

About 400 g of these particles are then coated with about 100 g of PRIMACOR* solids. The acid is expected to be released between about 1 and 2 hours after introduction to liquid water.

What is claimed is:

1. A composition comprising:

(1) a porous matrix, the matrix comprising and substantially inert to an absorbed acid:

(2) a midlayer surrounding the matrix and consisting essentially of one or more salts of the acid: and (3) a membrane surrounding the matrix, the membrane being exterior of the midlayer, the membrane further being substantially inert to the midlayer and permeable to the environment, the thickness and permeability of the membrane comprising means for controlling diffusion of a selected environment therethrough.

2. The composition of claim 1 wherein the matrix is porous fired clay.

3. The composition of claim 1 wherein the acid is selected from the group consisting of sulfuric, phosphoric, nitric, hydrochloric, hydrobromic, hydroiodic, hydrofluoric, formic, acetic, propionic, and lactic acids.

4. The composition of claim 1 wherein the midlayer is at least one of an ammonium, zinc, Group IA or Group IIA metal salt of the absorbed acid.

5. The composition of claim 4 wherein the Group IA and Group IIA metal salts are selected from the group consisting of calcium salts, magnesium salts, sodium salts, potassium salts, lithium salts, and mixtures thereof.

6. The composition of claim 1 wherein the acid is a liquid having a concentration of from about 70 percent to about 90 percent by weight.

7. The composition of claim 1 wherein the acid is substantially nonvolatile at room temperature.

8. The composition of claim 1 wherein the matrix has a diameter within the range of from about 0.05 mm to about 3 mm.

9. The composition of claim 1 wherein the matrix has a diameter within the range of from about 0.5 mm to about 2 mm.

10. The composition of claim 1 wherein the membrane has a thickness within the range of from about 5 μm to about 40 μm.

11. The composition of claim 1 wherein the membrane has a thickness within the range of from about 5 μm to about 25 μm.

12. The composition of claim 1 wherein the membrane comprises a material selected from the group consisting of polycarbonates, polystyrene, cellulose esters, glycolide/lactide copolymers, polytetrafluoroethylene dispersions, colloidal suspensions selected from the group consisting of colloidal silica and colloidal sulfur, lacquers, cellulose ethers, starches, chemically modified starch products, monomeric vapor coatings, plasma generated materials, natural latexes, synthetic latexes selected from the group consisting of styrene-butadiene rubber, neoprene, polyvinyl chloride, polyvinylidene chloride, polyvinylidene dichloride, ethylene acrylic acid and polystyrene, and mixtures thereof.

13. The composition of claim 1 wherein the membrane comprises a latex coating.

14. The composition of claim 1 wherein the membrane further comprises submicron particles.

15. The composition of claim 14 wherein the submicron particles are substantially inert to the membrane and the absorbed acid.

16. The composition of claim 14 wherein the submicron particles are selected from the group consisting of aqueous colloidal silica, fumed silica, fumed alumina, fumed magnesia, fumed calcia, fumed carbon, fumed titania, polytetrafluoroethylene, an organic polymer and mixtures thereof.

17. The composition of claim 14 wherein the submicron particles are present in an amount within the range of from about 0.1 ppm to about 50,000 ppm relative to the membrane.

18. The composition of claim 14 wherein the submicron particles are present in an amount within the range of from about 1 ppm to about 5,000 ppm relative to the membrane.

19. The composition of claim 1 wherein the selected environment is aqueous.

20. A method of preparing a controlled release composition comprising the steps of (1) absorbing an acid into a porous matrix that is substantially inert to the acid;

(2) surrounding the matrix with a midlayer consisting essentially of a salt of the acid; and (3) surrounding the matrix with a membrane, the membrane being exterior of the midlayer, the membrane further being substantially inert to the midlayer and permeable to a selected environment, the thickness and permeability of the membrane comprising means for controlling diffusion of the environment therethrough.

21. The method of claim 20 wherein the matrix is porous fired clay.

22. The method of claim 20 wherein the acid is selected from the group consisting of sulfuric, phosphoric, nitric, hydrochloric, hydrobromic, hydroiodic, hydrofluoric, formic, acetic, propionic, and lactic acids.

23. The method of claim 20 wherein the midlayer is an ammonium, Group IA or Group IIA metal, or zinc salt of the absorbed acid.

24. The method of claim 20 wherein the midlayer is evolved by exposing the matrix comprising the absorbed acid to a base.

25. The method of claim 24 wherein the base is selected from the group consisting of ammonia gas, zinc oxide, zinc hydroxide, and solid Group IA and Group IIA metal oxides and hydroxides.

26. The method of claim 25 wherein the solid Group IA and Group IIA metal oxides and hydroxides are selected from the group consisting of calcium oxide, magnesium oxide, sodium-hydroxide, potassium hydroxide, lithium hydroxide, and mixtures thereof.

27. The method of claim 20 wherein the midlayer is applied as a coating surrounding the matrix.

28. The method of claim 20 wherein the acid is a liquid having a concentration of from about 70 percent to about 90 percent by weight.

29. The method of claim 20 wherein the acid is substantially nonvolatile at room temperature.

30. The method of claim 20 wherein the matrix has a diameter within the range of from about 0.05 mm to about 3 mm.

31. The method of claim 20 wherein the matrix has a diameter within the range of from about 0.5 mm to about 2 mm.

32. The method of claim 20 wherein the membrane has a thickness within the range of from about 5 $\mu$m to about 40 $\mu$m.

33. The method of claim 20 wherein the membrane has a thickness within the range of from about 5 $\mu$m to about 25 $\mu$m.

34. The method of claim 20 wherein the membrane comprises a material selected from the group consisting of polycarbonates, polystyrene, cellulose esters, glycolide/lactide copolymers, cellulose ethers, starches, chemically modified starch products, polytetrafluoroethylene dispersions, colloidal suspensions selected from the group consisting of colloidal silica and colloidal sulfur, lacquers, monomeric vapor coatings, plasma generated materials, natural latexes, synthetic latexes selected from the group consisting of styrene-butadiene rubber, neoprene, polyvinyl chloride, polyvinylidene chloride, polyvinylidene dichloride, ethylene acrylic acid and polystyrene, and mixtures thereof.

35. The method of claim 20 wherein the membrane further comprises submicron particles.

36. The method of claim 35 wherein the submicron particles are substantially inert to the membrane and the absorbed acid.

37. The method of claim 35 wherein the submicron particles are selected from the group consisting of aqueous colloidal silica, fumed silica, fumed alumina, fumed magnesia, fumed calcia, fumed carbon, fumed titania, polytetrafluoroethylene, an organic polymer and mixtures thereof.

38. The method of claim 35 wherein the submicron particles are present in an amount within the range of from about 0.1 ppm to about 50,000 ppm relative to the membrane.

39. The method of claim 35 wherein the submicron particles are present in an amount within the range of from about 1 to about 5,000 ppm relative to the membrane.

40. The method of claim 20 wherein the environment is aqueous.

* * * * *